United States Patent
Foster et al.

[11] Patent Number: 5,315,649
[45] Date of Patent: May 24, 1994

[54] TOLL CALL TELEPHONE SERVICE CENTER

[75] Inventors: Peter J. Foster, Dallas; Kim S. Terry, Richardson, both of Tex.

[73] Assignee: VCS Industries, Inc., Dallas, Tex.

[21] Appl. No.: 869,242

[22] Filed: Apr. 15, 1992

[51] Int. Cl.⁵ .................................... H04M 3/44
[52] U.S. Cl. ........................... 379/355; 379/88; 379/201
[58] Field of Search ............. 379/88, 68, 74, 201, 379/355, 188

[56] References Cited

U.S. PATENT DOCUMENTS

| | | | |
|---|---|---|---|
| 4,348,550 | 9/1982 | Pirz et al. | 379/355 |
| 4,827,500 | 5/1989 | Binkerd et al. | 379/88 |
| 5,007,081 | 4/1991 | Schmuckal et al. | 379/355 |

Primary Examiner—James L. Dwyer
Assistant Examiner—Ahmad F. Matar
Attorney, Agent, or Firm—David H. Judson

[57] ABSTRACT

A toll call service center of the present invention is accessible by subscribers to a toll call service. One or more of the subscribers of the service have their own set of identifiers uniquely associated with a plurality of called stations desired to be accessed by the subscriber. The center comprises a voice command system having a storage for storing representations of the identifiers at storage locations uniquely identified with the subscriber. The command system also includes an announcing circuit and a processor operative under the control of a program stored therein. The processor is responsive to reception of an incoming call from a subscriber for controlling the announcing circuit to request the subscriber to speak an identifier associated with one of the plurality of called stations. A voice recognizer is responsive to receipt of the identifier for determining whether the identifier is valid. If the identifier is recognized as belonging to the subscriber, the processor controls an outdialer to dial the telephone number of the called station associated with the identifier.

3 Claims, 1 Drawing Sheet

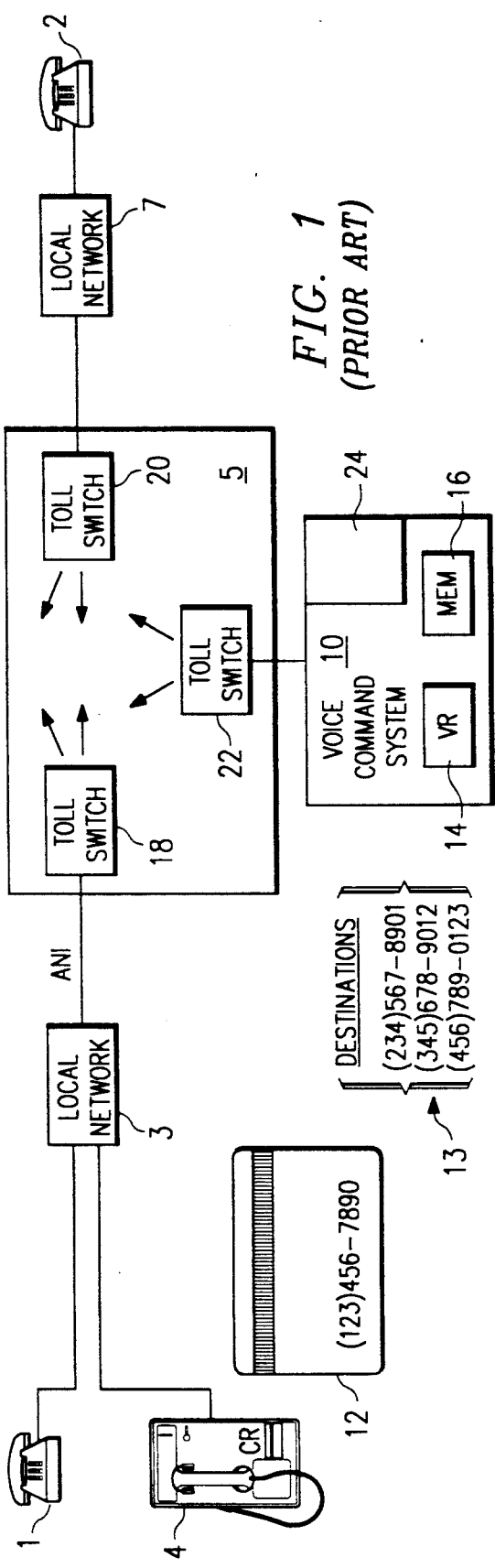
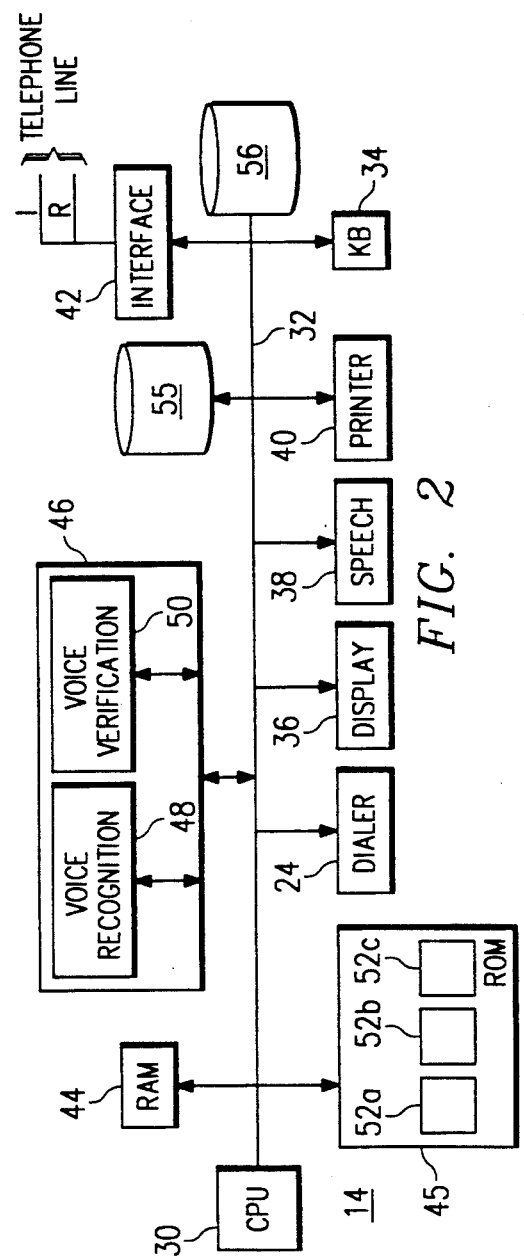

5,315,649

TOLL CALL TELEPHONE SERVICE CENTER

TECHNICAL FIELD

The present invention relates generally to telephone calling card services for permitting telecommunications customers to access and effect toll calls over a telephone network.

BACKGROUND OF THE INVENTION

Telephone "calling" cards are well-known in the prior art. Such cards typically include a memory comprising a magnetic tape or other storage media affixed to the card. Data in this storage media typically identifies the card number and the account to which the card has been assigned, and it may also comprise an authorized user's personal identification number or "PIN." To effect a toll call, the card is inserted into a cardreader (or the bearer is prompted to enter the card data via the telephone keypad) and relevant information is read from the card for subsequent billing.

Some cards include a data processing capability in the form of a microprocessor and an associated control program. Such "smart" cards have been used in prior art voice command systems wherein it is important to limit access to certain services to only authorized users. For example, U.S. Pat. No. 4,827,518 to Feustel et al describes a speaker verification and voice command system wherein speech templates are stored in the card. To verify the user's identity, a comparison is made between a plurality of reference speech templates stored in the card and a test template formed from a word or words spoken by the user at a transaction terminal. A similar system is described in U.S Pat. No. 3,896,266 to Waterbury.

Such prior art systems are effective but are significantly complex and somewhat expensive. They require the use of specialized hardware to generate and store the coded information on the cards, as well as the use of precise verification algorithms to discriminate the voice of an authorized user from all unauthorized users. Moreover, prior art voice verification schemes do not always work effectively over the telephone network. Generally, this is because the telephone network is a challenging environment that degrades the quality of speech through the introduction of various types of noise and band-limitations. Such economic and technological limitations have in large part prevented voice command calling systems from being commercialized.

There is thus a need for methods and systems that overcome these and other problems associated with the prior art.

BRIEF SUMMARY OF THE INVENTION

It is an object of the present invention to implement a simple, yet cost effective method for toll call telephone service using voice recognition techniques.

It is a further object of the invention to provide for caller-controlled toll call telephone service wherein conventional or "dumb" calling cards are used to access the service.

It is another object of the invention to provide a telephone network-based telephone service wherein each of the subscribers to the service has a unique set of available destination numbers that he or she can access through a dedicated voice recognition voice command system.

In the preferred embodiment, each of the subscribers to the service is provided with a calling card that enables access to the service offering. Upon subscribing to the service, the subscriber is asked to identify a predetermined set of persons or destinations that he or she desires to call from time-to-time using the card and the calling service. The subscriber identifies each such person or destination in his or her own unique or predetermined way. Thus the subscriber may choose to "encode" the person's identity by a name, a number, a special name or in some other coded fashion known only to the subscriber or to those persons authorized by the subscriber. The voice command system creates a template for each such person using a voice recognition subsystem. Such information, along with the destination number for each person of the set, is then stored by the voice command system. The location of all such information in memory is uniquely associated with the calling card number. Alternatively, and in the preferred embodiment, each subscriber selects his or her own special "identifier" that the subscriber must recite prior to accessing the special "names" associated with the subscriber.

When the subscriber desires to use the service, access is initially effected either by the user pulling the card through a cardreader at the telephone or by the voice command system otherwise prompting the subscriber to enter the card number via the telephone keypad. Upon accessing the service, the subscriber is prompted to state his or her special identifier if such identifier has been previously stored. Upon verification of the identifier, the subscriber is then prompted to identify which of the predetermined persons or destinations of the set he or she desires to call. The subscriber, having unique knowledge of the "identity" of the destination party, then speaks the appropriate word to word. This word is then processed by the voice recognition subsystem to determine whether it corresponds to any of the previously stored identifications. If so, the voice command system obtains the called party's telephone number and outdials the call.

The present invention is thus quite simple to implement as it does not require any special type of "smart" calling card or equipment to initialize such cards with coded information that must be verified before transactions are effected. Rather, the invention merely envisions that each subscriber identify each of a predetermined set of persons or destinations sought to be called, and then access the service in a conventional manner (i.e., by simply entering the card number). The security of the system is achieved by enabling each authorized subscriber the opportunity to encode the identity in memory where his or her special "names" are located as well as the names themselves. Since each subscriber only has a relatively small number (e.g., 10–20) of stored identifiers, the matching process can be carried quite efficiently, even with relatively simple recognition algorithms.

According to the invention, a toll call service center is accessible by subscribers to a toll call service. One or more of the subscribers of the service have their own set of identifiers uniquely associated with a plurality of called stations desired to be accessed by the subscriber. The center comprises a voice command system having a storage for storing representations of the identifiers at storage locations uniquely identified with the subscriber. The command system also includes an announcing circuit and a processor operative under the control of a program stored therein. The processor is responsive to reception of an incoming call from a subscriber for controlling the announcing circuit to request the subscriber to speak an identifier associated with one of the plurality of called stations. A voice recognizer is responsive to receipt of the identifier for determining whether the identifier is valid. If the identifier is recognized as belonging to the subscriber, the processor controls an outdialer to dial the telephone number of the called station associated with the identifier.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a block diagram of a toll network for providing the caller-controlled toll service of the present invention; and FIG. 2 is a schematic diagram of the voice command system of FIG. 1 for use in the toll network of FIG. 1.

DETAILED DESCRIPTION

FIG. 1 is a block diagram of a conventional toll system having a voice command system 10. According to the invention, each of the "authorized" subscribers to the service is provided with a calling card 12 that enables access to the service offering. Upon subscribing to the service, the subscriber is asked to identify a predetermined set of persons or destinations identified as reference numeral 13 that he or she desires to call from time-to-time using the card and the calling service. As noted above, the subscriber identifies each such person or destination in his or her own unique or predetermined way. Thus the subscriber may choose to "encode" the person's identity by a name, a number, a special name or in some other coded fashion known only to the subscriber or to those persons authorized by the subscriber. For example, assume the subscriber wishes to include his parents, his sister and his brother. During subscription to the service, the subscriber records a unique identifier for each such called party. For example, he may wish to refer to his parents as "mom and dad" or "parent." Alternatively, he may use a number such as "13" or other identifier. A similar encoding is made for other members of the set (such as "sis" or "Nancy," etc.).

The voice command system 10 includes a voice recognition subsystem 14 that creates a template for each such person. Such information, along with the destination number for each person of the set, is then stored in a memory 16 in voice command system. The location of all such information in memory is uniquely associated with the calling card number. Alternatively, and in the preferred embodiment, each subscriber selects his or her own special "identifier" that the subscriber must recite prior to accessing the special "names" associated with the subscriber.

Referring now back to FIG. 1, assume a caller at calling telephone 1 wishes to reach one of his or her predetermined persons or destinations associated with called telephone 2 (e.g., destination number (234) 567-8901). Called telephone 2 is located in a different area code. If calling telephone 1 is a conventional unit (located at the subscriber's home for example), the calling card service may not be required. In such case, the call is set up over local network 3 via toll network 5 to local network 7 for accessing called telephone 2. Toll network 5 may be a mobile or personal communications network. In toll network 5, the toll switch 18 is accessed from local network 3. The calling customer's number is forwarded from local network 3 via automatic number identification (ANI) signals. Toll switch 18 sets up a connection over toll network 5 to local network 7 via toll switch 20. Called telephone 2 is then alerted.

Assume now that the subscriber is not located at home and must place the call to telephone 2 via a phone 4 (e.g., a paystation, cellular phone, mobile phone, etc.). Paystation 4 may include a cardreader for receiving the magnetic stripe of a subscriber's calling card 12 as previously described. In this case, the subscriber pulls his or her card through the reader. In response, toll switch 18 initiates the establishment of a connection to toll switch 22 for accessing voice command system 10. Alternatively, the subscriber may simply dial (or "speak") a telephone number dedicated to the voice command system. Of course, the voice command system 10 can be dialed directly from toll switch 18 (or even local network 3).

Upon access, the voice command system preferably announces or welcomes the user to the service offering and prompts the subscriber through one or more steps to effect the call to the telephone 2. For security, the subscriber may be required to enter a password (via the keypad or through spoken input) that must be initially verified before the system allows the transaction to proceed. After the security barriers are passed, the system prompts the subscriber to speak his or her unique identifier for the person or destination associated with telephone 2. The voice recognition subsystem then determines if the spoken input matches any of the stored templates for the subscriber. If so, the telephone number of the telephone 2 is retrieved from storage and supplied to an autodialer 24.

The autodialer dials the number of the telephone 2 by accessing toll switch 20 through toll switch 22, or by accessing toll switch 20 (or local network 7) directly. Once the call is completed, the connection between the appropriate switches is disconnected. Information concerning the subscriber, the identity of the called party, and the date, time and length of the call is then stored in the voice command system for billing the subscriber.

Although not meant to be limiting, each toll switch may be a 4ESS switch manufactured by AT&T Technologies and described in *The Bell System Technical Journal*, Vol. 56, No. 7, pages 1015–1320, September 1977, which is incorporated herein by reference.

Referring now to FIG. 2, the voice command system 10 includes a voice recognition algorithm 48 and optionally a voice verification algorithm 50 to facilitate voice-controlled access to the service offering. The system includes a central processing unit (CPU) 30 for controlling the overall operation of the system. The CPU includes data, address and control buses represented generally by the reference numeral 32. As seen in FIG. 2, the system 14 also includes conventional input- /output devices such as a keyboard 34, display terminal 36, speech generator 38 and printer 40. A communications interface 42 (which may be microprocessor-controlled) interfaces the system to the telephone line(s) and trunks. Random access memory ("RAM") 44 is connected to the CPU by bus 32 for providing temporary storage of data processed thereby. Read only memory ("ROM") 45 is likewise connected to the digital processor for providing permanent storage of recognition and verification data. Disk storage 46 supports control programs including the voice recognition algorithm 48 and optionally the voice verification algorithm 50 as well as suitable control programs (not shown). A voice command system of this type is described in U.S. Pat. No. 5,127,043, to Hunt et al., titled "Simultaneous Speaker-Independent Voice Recognition And Verification Over A Telephone Network," assigned to the assignee of the present invention and incorporated herein by reference.

The voice recognition algorithm may be based on speaker-dependent or speaker-independent discrete or continuous recognition. Such techniques are known in the prior art. In the present invention, preferably a speaker-dependent system is used to reduce cost. Thus each authorized user of the service is enrolled in the system and provided a calling card. The system 10 thus also includes a voice verification reference database 55 comprising voice verification class reference data collected from users authorized to access the service. As noted above, enrollment is preferably accomplished by having the subscriber speak a plurality of "identifiers" uniquely associated with a set of persons or destinations desired to be called by the subscriber. Each identifier is spoken a number of times while the recognizer is "trained" in a conventional manner. A template is created for each identifier of the set and stored in memory at a location identified with the subscriber. The system 10 also includes a transaction database 56 for storing billing and transaction data, such as account number, called number(s), length of call, etc.

When the subscriber desires to use the service, as noted above access is initially effected either by the user pulling the card through a cardreader at the telephone or by the voice command system otherwise prompting the subscriber to enter the card number via the telephone keypad. Upon accessing the service, the subscriber is prompted by speech generator 38 to state his or her special identifier if such identifier has been previously stored. Upon verification of the identifier by the recognizer, the subscriber is then prompted by speech generator 38 to identify which of the predetermined persons or destinations of the set he or she desires to call. The subscriber, having unique knowledge of the "identity" of the destination party, then speaks the appropriate word. This word is then processed by the voice recognition subsystem to determine whether it corresponds to any of the previously stored identifications. Alternatively, the voice recognition system simply obtains and uses the closest "match" to the previously-stored identifications. The voice command system then obtains the called party's telephone number and outdials the call through the outdialer 24.

If desired, the verification algorithm 50 is used to verify the user's identity with a spoken personal identification code. The caller must enter the code and be "verified" as an authorized subscriber before obtaining access to his or her "identifiers."

It should be appreciated by those skilled in the art that the specific embodiments disclosed above may be readily utilized as a basis for modifying or designing other structures and systems for carrying out the same purposes of the present invention. For example, the voice command system may be located between the local and toll networks. It should also be realized by those skilled in the art that such equivalent constructions do not depart from the spirit and scope of the invention as set forth in the appended claims.

What is claimed is:

1. Toll call service center means accessible by subscribers to a toll call service comprising;
    storage means for storing a set of identifiers at storage locations uniquely identified with each subscriber to the toll call service, the set of identifiers being associated with a particular plurality of called stations uniquely determined by the subscriber with the identifiers being unique subscriber-encoded representations of the called station numbers desired to be accessed by the subscriber, the identifiers being stored in the storage means in an off-line enrollment process to the toll call service;
    announcing means;
    processor means, operative under the control of a program stored therein and responsive to reception of an incoming call from a subscriber, for controlling the announcing means to request the subscriber to speak an identifier associated with one of the plurality of called stations;
    voice recognition means, responsive to receipt of the identifier, for determining whether the identifier is valid for the subscriber; and
    dialer means, operative under the control of the processor means and responsive to recognition of a valid identifier for the subscriber, for dialing a telephone number of the called station associated with the identifier.

2. The toll call center service means as described in claim 1 wherein the storage locations uniquely identified with each subscriber are associated with a personal identification code stored on a subscriber's calling card.

3. The toll call center service means as described in claim 1 wherein the voice recognition means implements a speaker-dependent voice recognition process.

* * * * *